United States Patent [19]
Kawamura

[11] Patent Number: 5,630,187
[45] Date of Patent: May 13, 1997

[54] LENS DEVICE AND METHOD

[75] Inventor: Tomoaki Kawamura, Kanagawa, Japan

[73] Assignee: Nikon Corporation, Tokyo, Japan

[21] Appl. No.: 493,497

[22] Filed: Jun. 22, 1995

[30] Foreign Application Priority Data

Dec. 21, 1994 [JP] Japan .................................. 6-318010

[51] Int. Cl.⁶ .......................................................... G03B 7/26
[52] U.S. Cl. .......................................................... 396/304
[58] Field of Search ........................... 354/195.1–195.12, 354/484, 286

[56] References Cited

U.S. PATENT DOCUMENTS

| | | | |
|---|---|---|---|
| 3,703,132 | 11/1972 | Beach | 354/484 |
| 4,200,374 | 4/1980 | Shimizu et al. | 354/484 |

FOREIGN PATENT DOCUMENTS 4-66908  3/1992  Japan .

*Primary Examiner*—David M. Gray
*Attorney, Agent, or Firm*—Oliff & Berridge

[57] ABSTRACT

A lens device that is not affected by changes in environmental conditions and is capable of manual and automatic focussing of the lens. Specifically, the lens device generates an appropriate operational load during manual operations of the lens using a simple structure. The lens device includes a lens barrel containing a lens holding barrel holding the lens. The operation ring has the ability to rotate and is fitted around the outer periphery of the lens barrel. The lens drive device includes a motor, a deceleration device, a motor drive circuit, and a variable resistor. The motor has the ability to generate electricity. The selection switch selectively connects the motor to either the motor drive circuit or the variable resistor. During automatic operation, the motor is connected to the motor drive circuit. The motor drive circuit is the power source of and drives the motor. The driven motor rotates the operation ring to adjust the focus through the deceleration device. During manual lens operation, the motor is connected to the variable resistor. Through the deceleration device, electricity is generated because of operation ring rotation. The generated electric power is consumed by the variable resistor and the motor, thereby generating an appropriate operational load. The resistance of the variable resistor can be set through an adjustment knob.

24 Claims, 10 Drawing Sheets

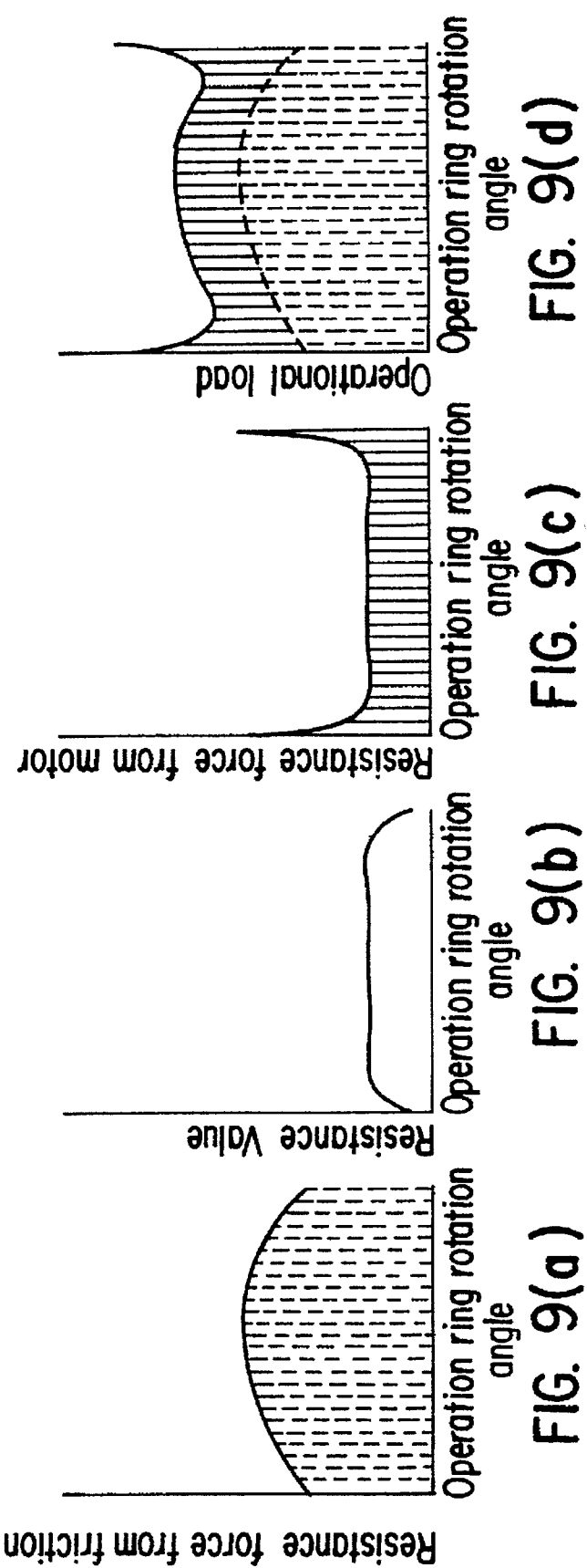

LENS DEVICE AND METHOD

BACKGROUND OF THE INVENTION

1. Field of the Invention

A lens device is provided that is not affected by changes in environmental conditions and is capable of manual and automatic focussing. Specifically, using a simple structure, the lens device generates an appropriate operational load during automatic or motor driven operations and manual operations of the lens device.

2. Description of Related Art

Many conventional lens devices adjust the focus by manually moving the lens contained within the lens barrel. Cameras, for example, use such lens focusing devices. These types of lens devices are usually equipped with an operation ring around the outer periphery of the lens barrel. By rotating the operation ring, the lens in the lens barrel moves in a known manner. In addition, a high viscosity lubricating oil is applied to all lens barrel sliding parts to reduce friction. However, the operation ring is preferably designed to retain a limited amount of friction. While rotating the operation ring, the limited friction causes an appropriate operational load. During lens barrel use, the appropriate operational load improves fine-tuning of the focus and provides a high-quality feel to the user.

However, lubricating oil viscosity varies considerably with temperature. In other words, the lens barrel operational load of the camera changes between high temperature and low temperature use. Further, user survey results indicate in situations of extreme heat or severe cold, the environment is suspected of inadvertently influencing the rotation of the operation ring itself.

There are variations or ranges in the operational load, that feels most comfortable to individual photographers. Further, depending upon where the camera is used, there are situations where the user finds changing the operational load desirable. In other words, having the operational load of the operation ring freely adjustable by the photographer may be beneficial.

A lens device for cameras that selectively adjusts the lens movement using a lens drive device and manual lens movement is well known in the art. Such a conventional lens device for cameras, for example, is shown in FIG. 10.

In FIG. 10, a lens device 40 for cameras includes a lens holding barrel 2 holding a lens 1, and a cam-follower 5 protrudes from the lens holding barrel 2 periphery. A lens barrel 3 holds the lens holding barrel 2 through the cam-follower 5. An operational ring 6 is rotatably mounted at the periphery of the lens barrel 3. A lens drive device 41 rotates the operation ring 6. The central part of the cam-follower 5 is slidingly inserted into an optical axis direction channel 4 provided at the circumference partition of the lens barrel 3. The optical axis direction channel 4 is substantially parallel to the optical axis direction. The tip part of the cam-follower 5 is slidingly inserted into a non-optical axis direction cam channel 7 provided at the circumference partition of the operation ring 6. The non-optical axis direction channel 7 is substantially perpendicular to the optical axis direction. The lens drive device 41 also includes a motor 13, a motor drive circuit 14 that drives the motor 13, a switch 42, and a deceleration device 11. The deceleration device 11 includes a gear 12 that intermeshes with a gear 9 located at the periphery of the operation ring 6.

The lens device 40 enables manual focussing of the lens or through the lens drive device 41 automatic focussing of the lens. The photographer connects the switch 42 to the motor drive circuit 14 to automatically rotate the operation ring 6 through lens drive device 41. When switch 42 is connected, the motor drive circuit 14 drives the motor 13, which through the deceleration device 11 rotates the operation ring 6. During manual operations, switch 42 is opened, and the operation ring 6 is rotated by hand. When the operation ring 6 is rotated, the cam-follower 5 correspondingly moves along channel 4 in the direction of the optical axis in a known manner. The cam-follower 5 travel direction is reversible according to the rotational direction of the operation ring 6. Therefore, the lens 1 moves reversibly with the lens holding barrel 2 along the optical axis without rotating inside the lens barrel 3.

However, in conventional lens devices as shown in FIG. 10, the motor load is preferably the smallest amount possible to improve the accuracy of the position control and the drive speed of the motor 13 in the lens drive device 41. To reduce the motor load, for example, the friction resistance of the lens movement mechanisms can be reduced by allowing play in the pressed-in parts of the cam-follower 5.

The friction resistance cannot be reduced beyond a minimal amount or a problem occurs when the lens barrel 3 is tipped and the lens holding barrel 2 inside spontaneously moves merely because of the weight of the lens 1. When the lens barrel moves, the operation ring 6 rotates. Under these conditions, providing the appropriate operational load during manual operations is unobtainable.

To handle such disparate conditions, prior art lens devices either prioritized motor drive focussing using a minimal motor load, and thereby during manual operations the operational load was less than optimal. Alternatively, the prior art lens devices prioritized manual operation focussing by increasing the friction resistance, and thereby increased the motor operational load beyond optimal limits.

To solve these problems, one prior art lens drive devices includes a viscosity resistance generation device. During manual operations, the viscosity resistance generation device provides an acceptable operational load through viscosity fluid viscosity resistance. Then, during motorized operations, the viscosity resistance generation device is bypassed and the motor drives the lens under an optimal low load condition.

However, the viscosity resistance generation device has a complicated structure and assembly. Additionally, when mechanisms are provided to freely adjust the operational load, the viscosity resistance generation device becomes even more complicated. Further, the viscosity fluid enclosed inside the camera complicates maintenance, and possible fluid leaks present potentially severe damage hazards.

SUMMARY OF THE INVENTION

It is an object of the invention to provide lens device that is not affected by changes in environmental conditions and is capable of manual and automatic focussing of the lens. Specifically, the lens device generates an appropriate operational load during manual operations of the lens using a simple structure.

To achieve this and other objects of the invention and to solve the problems described above, the lens device includes a lens, a lens barrel, operation member parts, a movement device, an electricity generation device and a electric consumption device. The lens barrel contains the lens and holds the operation member parts. The movement device moves the lens corresponding to the movement of the operation member parts. The electricity generation device generates electricity for motive power from the movement of the operation member parts. The electric power consumption device consumes the electric power generated by the electricity generation device.

The lens device can additionally include an electric power supply device to supply electric power to the electricity generation device. A connection circuit may electrically connect the electricity generation device to either the electric power consumption device or the electric power supply device. Therefore, the electricity generation device selectively outputs the electrical power from the electric power supply device to the movement device allowing movement of the lens. The lens device can also provide an adjustment device to adjust the electric power consumption amount of the electric power consumption device.

The electricity generation device is preferably a motor supplying the motive power to the movement device during automatic operations to move the lens. The electric power consumption device is preferably a load circuit consuming the electric power generated by the motor. The adjustment device is preferably a variable resistor in the load circuit. Further, the resistance of the variable resistor can change corresponding to the rotation of the operation member parts.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIG. 9 is an explanatory graph relating to the operational load of the lens device according to yet another embodiment of the present invention.

DETAILED DESCRIPTION OF PREFERRED EMBODIMENTS

Figure 1:
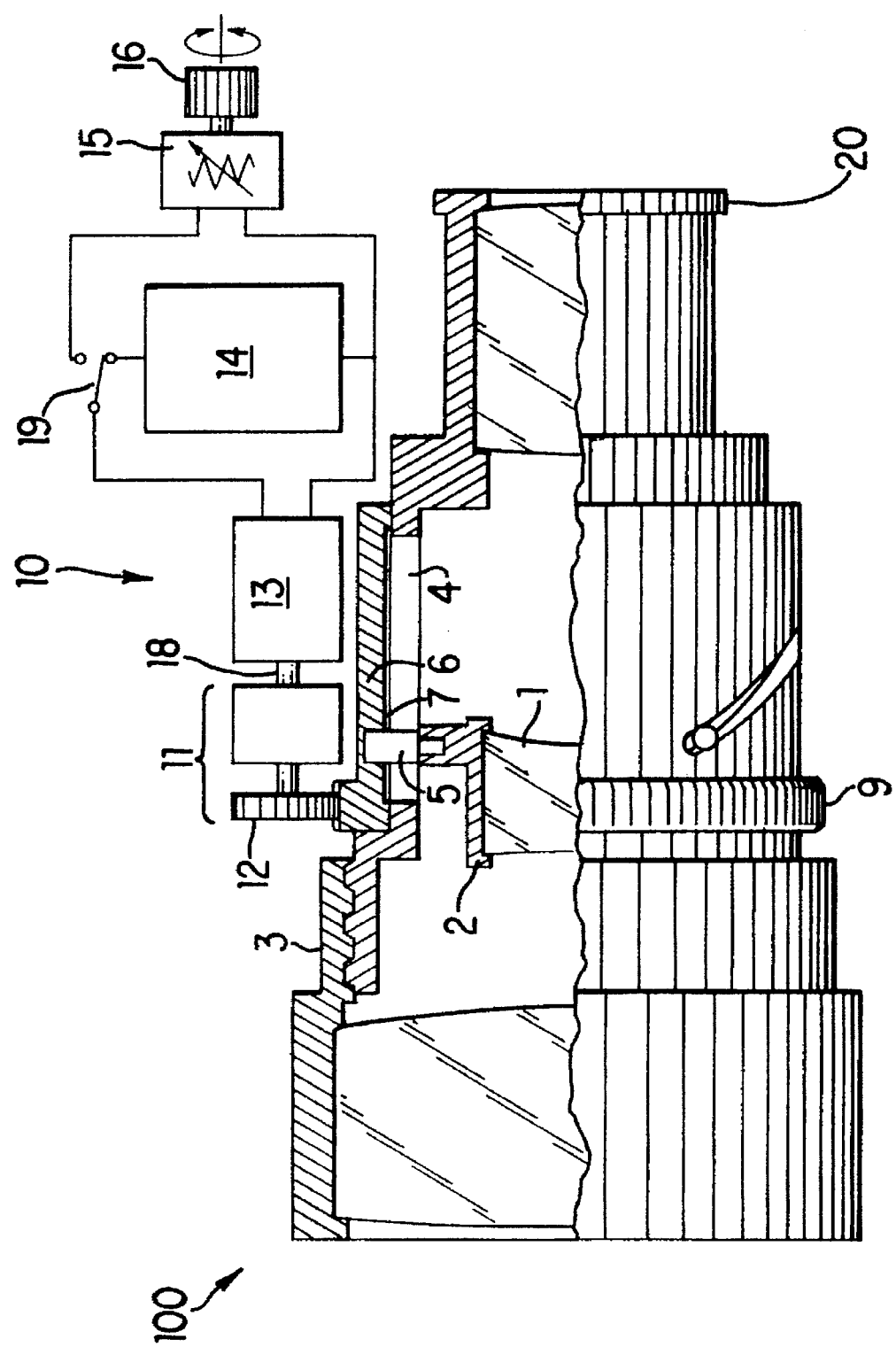
FIG. 1 is a block diagram showing a lens device (during motor drive) according to one embodiment of the present invention.

FIG. 1 is a structural diagram of a first preferred embodiment of a camera lens device according to the present invention. A lens device 100 is capable of lens movement to focus a camera through the lens drive device 10 as well as through manual lens movement.

As shown in FIG. 1, the lens device 100 includes a lens holding barrel 2 holding a lens 1 and a lens barrel 3 containing the lens holding barrel 2 and the lens 1. A rotatable operation ring 6 is fitted around the outer periphery of the lens barrel 3 and a cam-follower 5 protruding at the periphery of the lens holding barrel 2. The central component of cam-follower 5 is slidingly inserted into a channel 4 that is substantially parallel to the optical axis direction and located at the circumference partition of the lens barrel 3. The tip part of the cam-follower 5 is slidingly inserted into a cam channel 7 that is substantially perpendicular to the optical axis direction at the circumference partition of the operation ring 6. The cam-follower 5 moves reversibly along the channel 4 in the optical axis direction corresponding to the rotation of the operation ring 6 in a known manner. The lens 1 travels along the optical axis direction without rotating inside the lens barrel 3. A mount 20 of the lens barrel 3 attaches the lens device 100 to the camera main body (not shown). Further, the lens 1 may include multiple lenses held in the lens barrel 3.

A lens drive device 10 includes at least an electricity generating motor. For example, in the first preferred embodiment, a motor drive circuit 14 drives a direct current motor 13, which is capable of generating electricity. A variable resistor 15 and an adjustment knob 16 to change the resistance value of the variable resistor 15 are also part of the lens drive device. A selection switch 19 selectively connects either the motor drive circuit 14 or the variable resistor 15 to the motor 13. A deceleration device 11 connected to the motor 13 has a gear 12 that intermeshes with a gear 9 arranged at the outer periphery of the operation ring 6.

Figure 3:
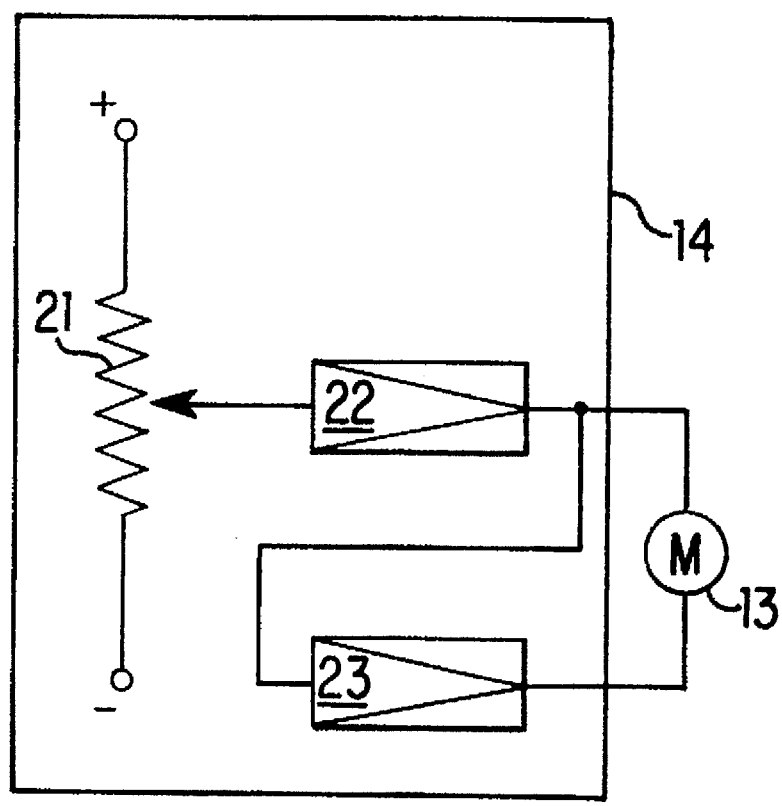
FIG. 3 is a diagram showing the structure of the motor drive circuit of a lens device according to one embodiment of the present invention.

FIG. 3 shows a diagram of the composition of the inside of one preferred embodiment of the motor drive circuit 14.

As shown in the FIG. 3, the motor drive circuit 14 includes a variable resistor 21 that is adjustable through external operation of the adjustment knob 16, a reverse amplifier 23 connecting both terminals from the motor 13, and a reverse amplifier 22 connecting one terminal from the motor 13 to the variable resistor 21. By changing the input electric potential of the reverse amplifier 22 between −V and +V and adjusting the variable resistor 21, the rotational speed and direction of the motor 13 is set corresponding to the input electric potential.

As shown in FIG. 1, during automated focussing operations or motor driven lens operations, the selection switch 19 connects to the motor drive circuit 14. This way, the drive circuit 14 drives the motor 13. The driven motor 13 rotates the operation ring 6 through the deceleration device 11. The lens 1 moves inside the lens barrel following the rotation of the operation ring 6.

Figure 2:
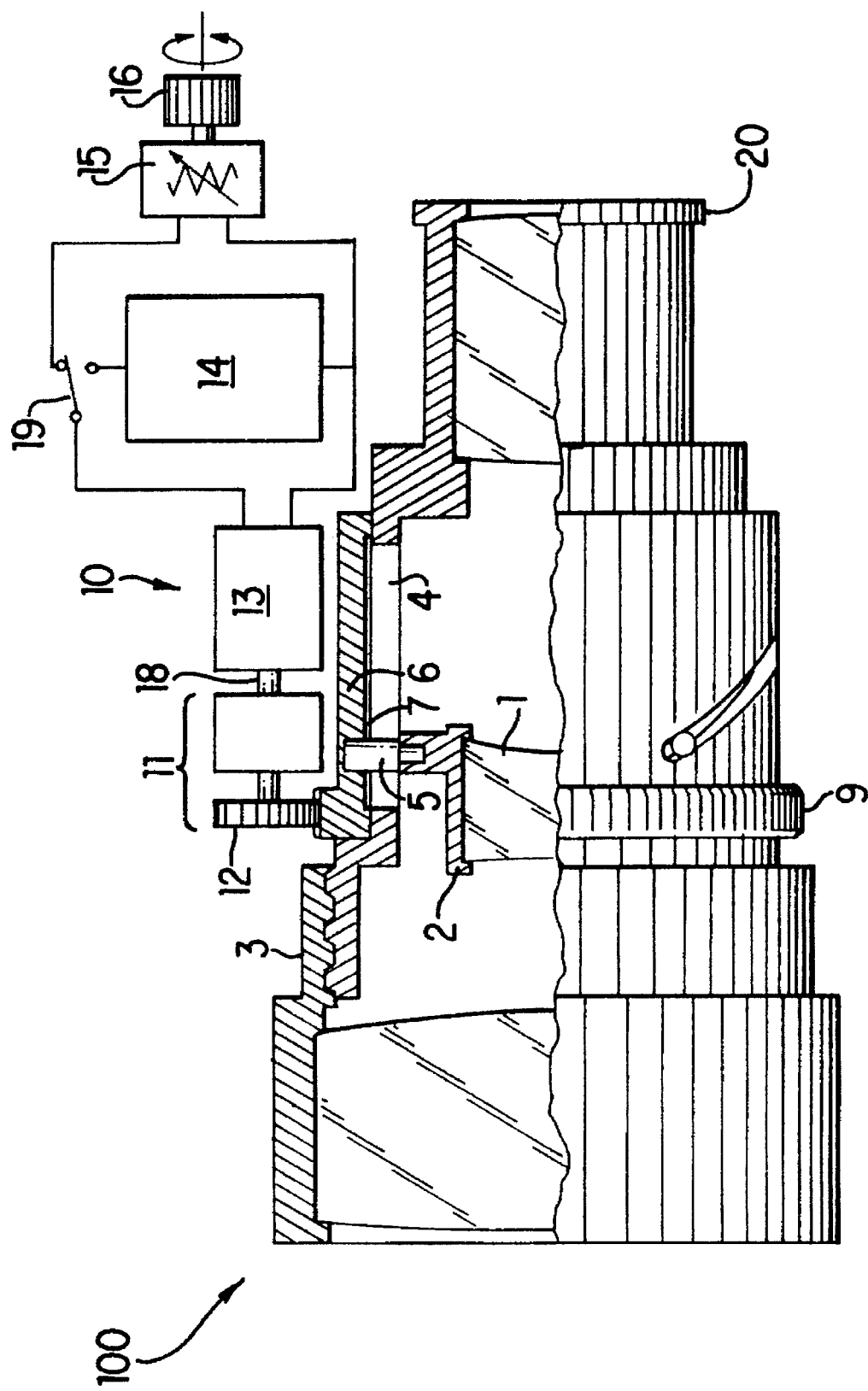
FIG. 2 is a block diagram showing a lens device (during manual operation) according to one embodiment of the present invention.

As shown in FIG. 2, during manual operation of the lens to perform focusing, the selection switch 19 is connected to the variable resistor 15. This way, the load circuit forms from both the motor 13 and the variable resistor 15. When rotating the operation ring 6 manually, the gear 9 on the outer periphery of the operation ring 6 rotates the gear 12 of the deceleration device 11. Therefore, the rotational movement of the operation ring 6 is transferred to a rotatable shaft 18 of the motor 13. Through the rotation of the rotatable shaft 18, electromotive force is generated between the terminals of the motor 13. Electric current flows to the load circuit, and torque is generated because of the electromagnetic induction in the rotatable shaft 18 of the motor 13.

The torque is a resisting force opposed to the rotational force of the operation ring 6. The electric current flowing to the load circuit changes in an inversely proportional relationship to the resistance value of the variable resistor 15. Additionally, the resulting torque changes in an inversely proportional relationship to the resistance value of the variable resistor 15. In other words, by adjusting the adjustment knob 16, the operator can set a preferred operational load of the operation ring 6 by adjusting the variable resistor 15. The amount of the resistance occurring in the rotatable shaft 18 can be determined using the following Formula 1.

$$T = Kt \cdot Ke \cdot \frac{N}{Rm + R} \quad (1)$$

In Formula 1, T is the resistance force (torque). Kt is the torque constant of the direct current motor 13. Ke is an electromotive force constant of the direct current motor 13. N is the number of rotations of the direct current motor 13. Rm is inside electric resistance of the direct current motor 13. R is a resistance value of the variable resistor 15.

As an example, assume that a lens device has a small size direct current motor able to generate electricity, and the number of revolutions for the motor is 2000 rpm. Changing the resistance value of the variable resistor 15 from 0 to infinity, the torque on the motor shaft changes from 14 to 0 g·cm. In other words, the photographer could select a torque between 7000 to 0 g·cm when the deceleration ratio of the deceleration device 11 is set to 500.

Figure 6C:
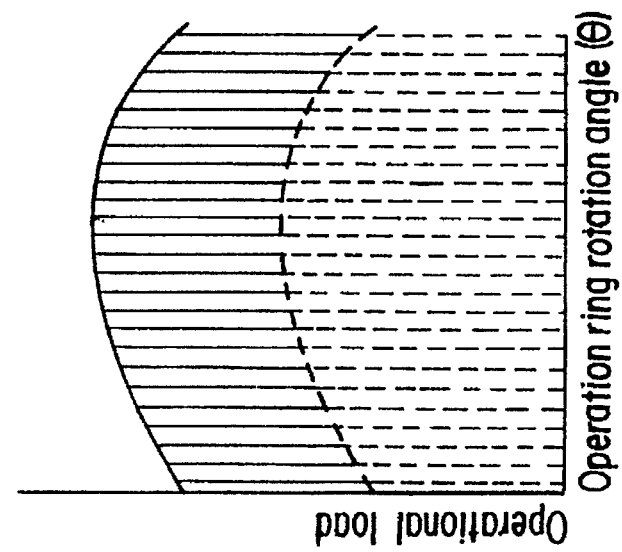
FIGS. 6A–C illustrate an explanatory graph relating to the operational load of a lens device according to one embodiment of the present invention.
Figure 6B:
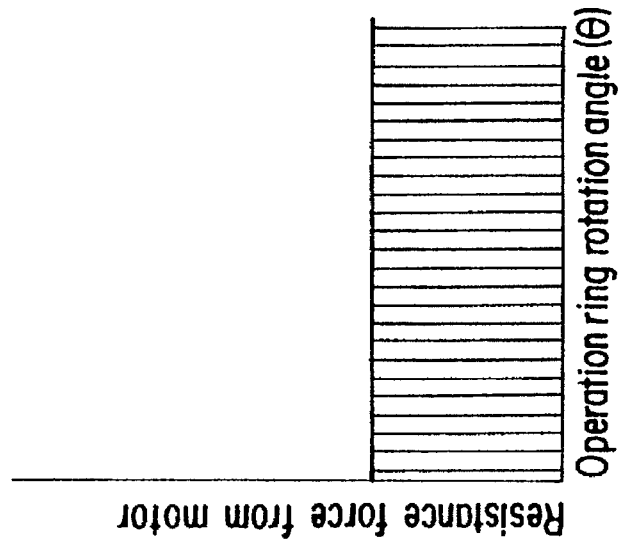
Figure 6A:
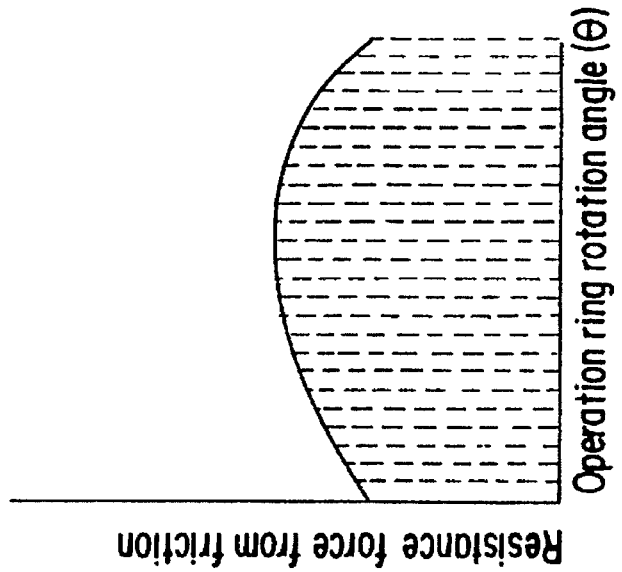

Moreover, the actual operational load, as effort required by the operator to rotate the operation ring 6 of the lens device 100 shown in FIG. 2, includes torque (resistance force) and the friction (resistance force) occurring during lens movement because of the structural friction resistance. The resistance force because of friction resistance has characteristics as shown in FIG. 6A for reasons such as the roundness processing error of the operation ring 6 and the lens barrel 3. In FIG. 6A, the friction resistance force becomes larger near the center of the rotation range of the operation ring 6. However, the friction resistance force because of the motor 13, as shown in FIG. 6B, is a constant value independent of the rotation angle of the operation ring 6. Therefore, in the first preferred embodiment, the actual operational load overcome by the operator during manual operations is shown in FIG. 6C.

Figure 4:
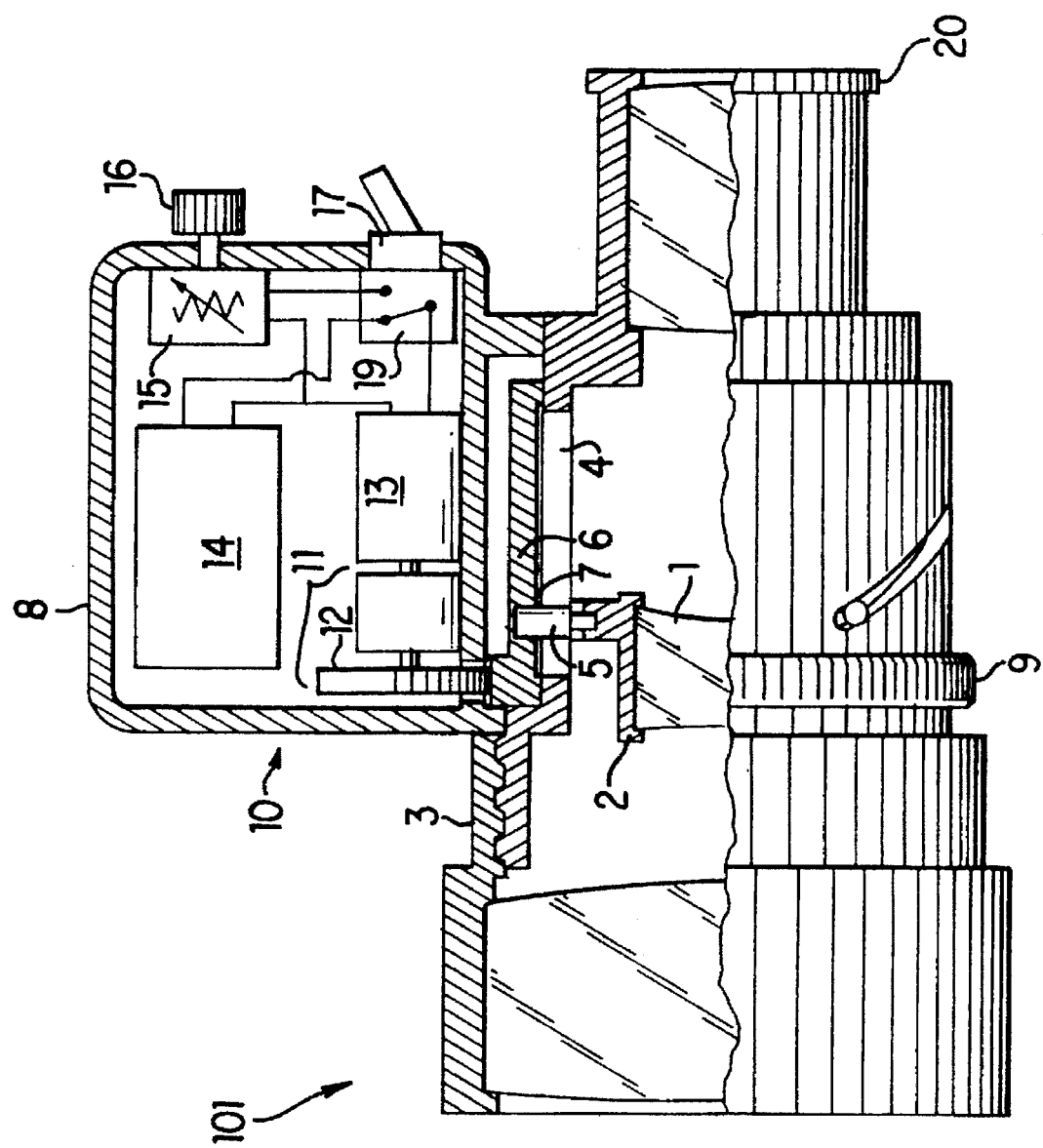
FIG. 4 is a block diagram showing the mounting of a lens device according one embodiment of the present invention to a camera body.

As shown in FIG. 4, the lens device of the first preferred embodiment can be mounted on the lens barrel. The lens drive device 10 is placed inside a case 8 that is fixed to the lens barrel 3. The adjustment knob 16 and the toggle switch 17 protrude from a lateral side of the case 8. The selecting switch 19 changes between manual operations and motor driven operations through toggling the toggle switch 17 from outside the case 8. Also, the adjustment knob 16 adjusts the resistance value of the variable resistor 15 from outside the case 8. Therefore, the first preferred embodiment, as explained above, provides a weighted operational load to the operator during manual lens movement through the addition of a simple load circuit and the selection switch to the prior art lens device. The operational load can be set freely within a fixed range. Of course, during automated or motor driven operations, the operational load is not generated. Therefore, smooth lens movement by the motor 13 continues. Further, camera durability is improved because there is no need for enclosing a viscosity fluid or for the complexity of the conventional viscosity fluid generation devices. Also, the first preferred embodiment has superior environmental resistance resulting from reduced temperature sensitivity. The lens device has reduced temperature sensitivity characteristics compared to the conventional viscosity fluid generation device.

Figure 5:
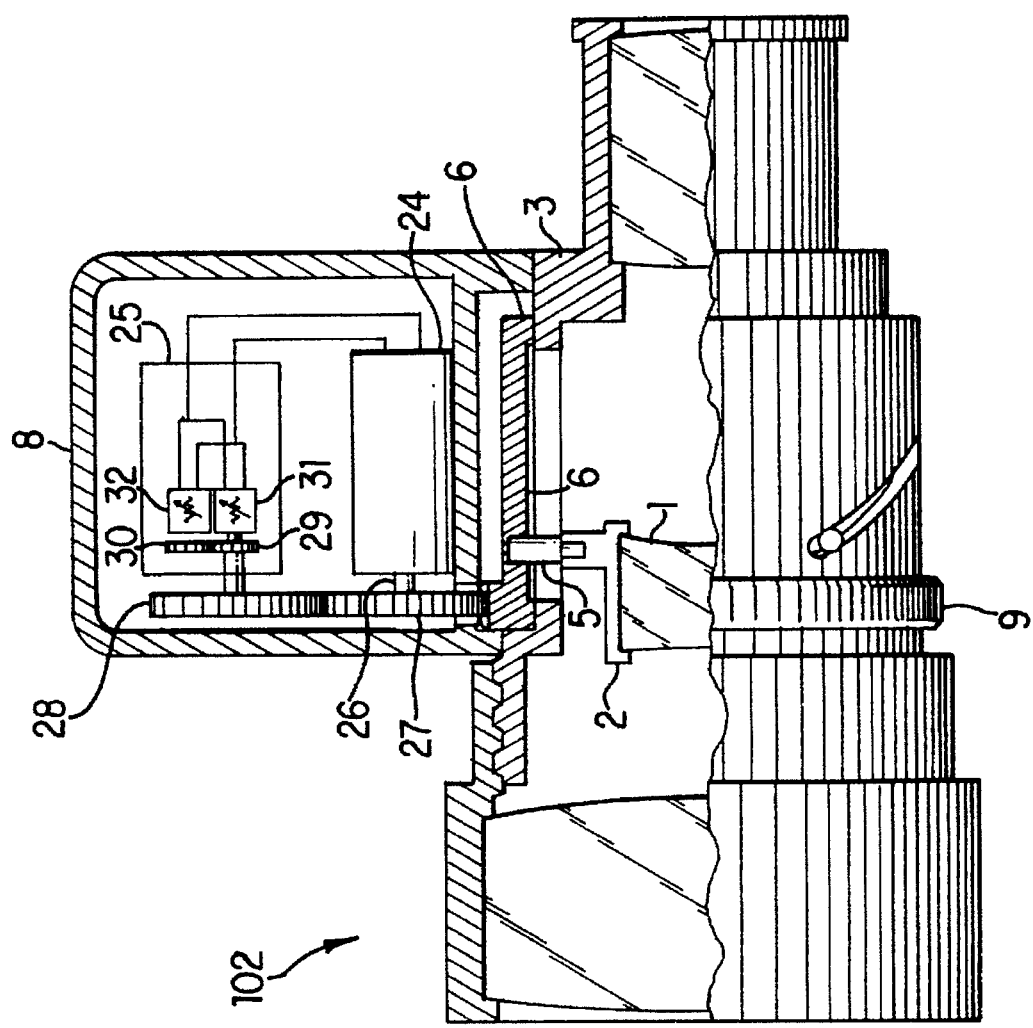
FIG. 5 is a block diagram showing a lens device according to another embodiment of the present invention.

Next, a second preferred embodiment according to the present invention will be described below. The lens device of the second embodiment performs lens movement for focussing only through manual operations. As shown in FIG. 5, a lens device 102 includes a motor 24 and a resistance value automatic setting instrument 25 connected to the terminals of the motor 24. The lens device 102 generates the weighted operational load using this structure and configuration. In the second preferred embodiment, the operational load can be automatically changed corresponding to the rotational angle of the operation ring 6.

The motor 24 generates electricity by the rotation of a rotatable shaft 26. A similar motor to that used in the first preferred embodiment is preferably used. The resistance value automatic setting instrument 25 includes a gear 28 that intermeshes with a gear 27 arranged at the rotatable shaft 26 of the motor 24. The gear 28 connects to a small gear 29 on the inside of the resistance value automatic setting instrument 25. The small gear 29 intermeshes with a small gear 30. The variable resistor 31 changes resistance corresponding to the rotation of the small gear 29. Using a similar arrangement, a variable resistor 32 changes resistance corresponding to a rotation of the small gear 30.

The gears 27 and 28, and further, the gears 29 and 30 rotate corresponding to the manual rotation of the operation ring 6. The variable resistor 31 sets the resistance value according to the rotational angle of the gear 29, and the variable resistor 32 sets the resistance value according to the rotational angle of the gear 30. Also, the motor 24 generates electricity by the rotation of the gear 27, and the resulting electric current flows to the variable resistor 31 and 32. This way, in the motor rotatable shaft 26 of the motor 24, a resistance force (torque) is generated according to the combined resistance of both of the variable resistors 31 and 32.

In the first preferred embodiment, an example of an operational load of the operation ring 6 was shown in FIG. 6. In certain cases, unlike the first preferred embodiment, the operational load will not conform to the rotation angle of the operation ring 6. Further, sometimes it is preferable for the operation load to always remain constant. When the operational load is constant or at least when the fluctuation of the operational load is small, the rotation of the operation ring 6 by a constant force is possible. Applying a constant force allows smooth movement of the lens. However, the fluctuation of resistance because of friction is not usually small, and therefore, the rotation of the operation ring 6 by a fixed force can be difficult.

Figures 7A, 7B, 7C:
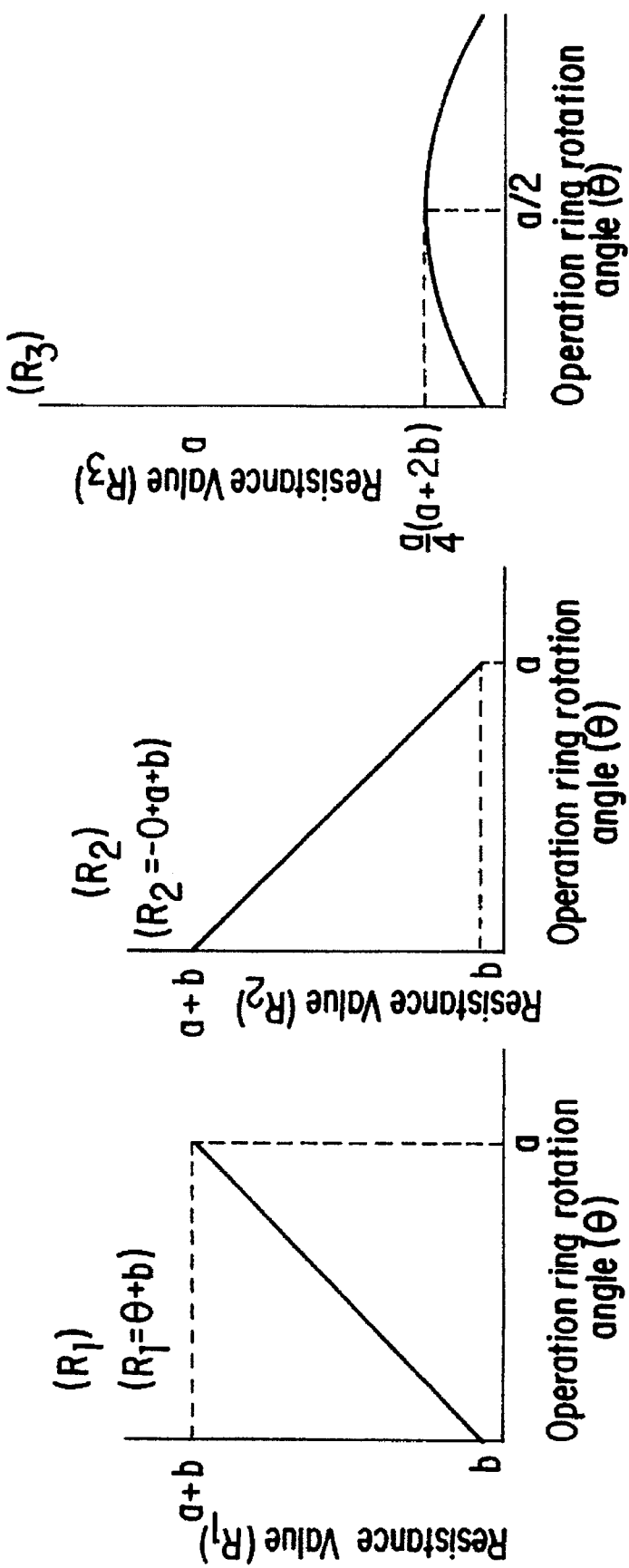
FIGS. 7A–C illustrate an explanatory graph relating to the resistance value of a lens device according to another embodiment of the present invention.
Figure 8C:
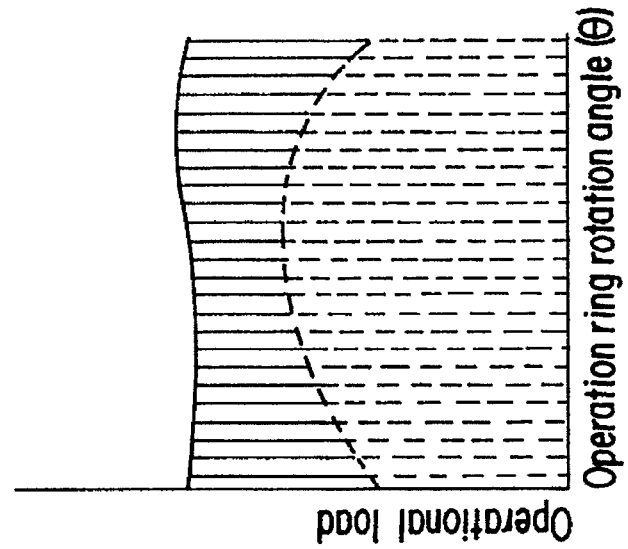
FIGS. 8A–C illustrate an explanatory graph relating to the operational load of the lens device according to another embodiment of the present invention.
Figure 8B:
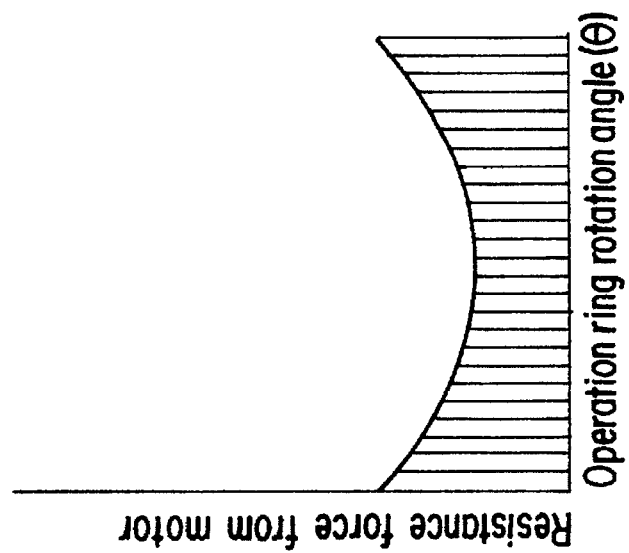
Figure 8A:
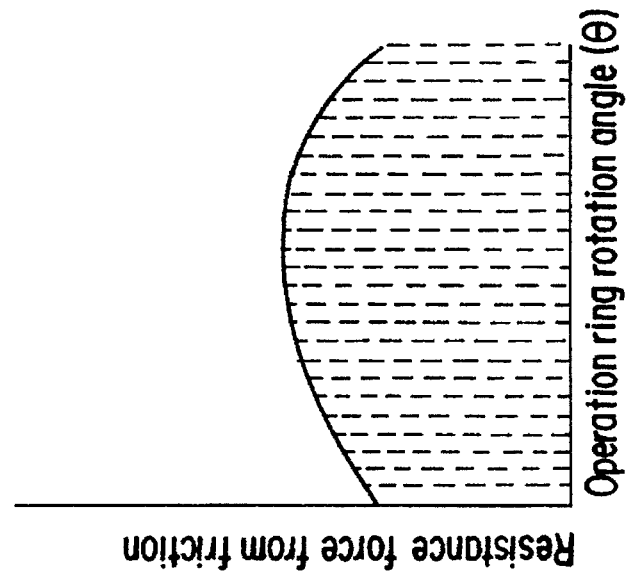
Figure 10:
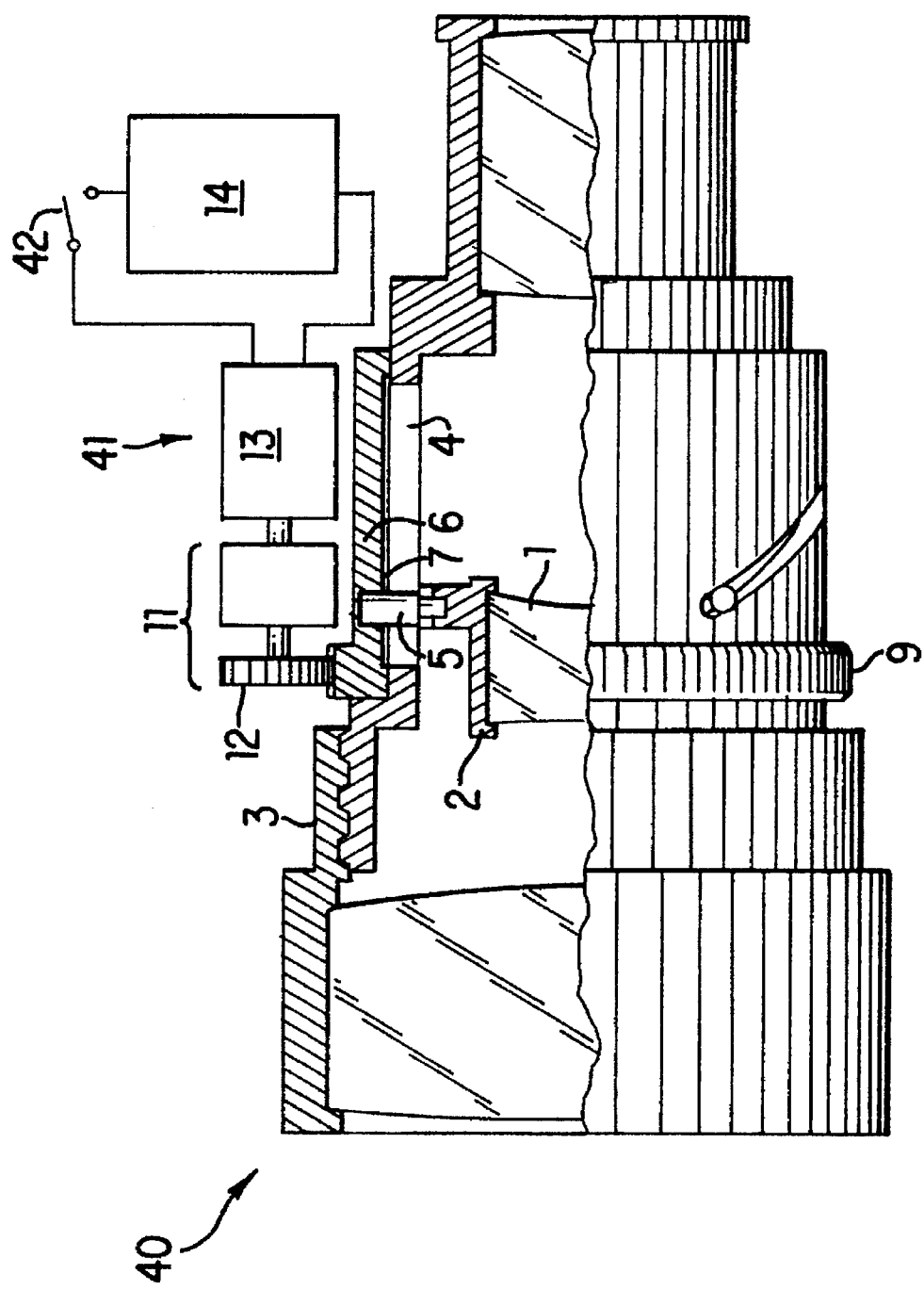
FIG. 10 is a block diagram of a conventional lens device.

Therefore, it is important to make the operational load constant for friction resistance as shown in FIG. 6A and FIG. 8A. The second preferred embodiment includes motor resistance force that negates or cancels the friction fluctuation as shown in FIG. 8B. The motor resistance force varies according to the unified two variable resistors 31 and 32 that are connected in parallel. Because the small gears 29 and 30 rotate concurrently in opposite directions when the operation ring 6 rotates, the change in resistance value of the variable resistors 31 and 32 have opposite characteristics, as shown in FIGS. 7A and 7B. In other words, as shown in FIG. 7A, when the rotational angle, ($\theta$), increases within the rotation angle range (0 to "a") of the operation ring, the resistance value ($R_1$) of the variable resistor 31 also increases by a fixed ratio from "b" to "a+b". In contrast, as shown in FIG. 7B, when the rotation angle ($\theta$) increases, the resistance value ($R_2$) of the variable resistor 32 reduces by a fixed ratio from "a+b" to "b".

Moreover, the combined resistance ($R_3$) for the two variable resistors 31 and 32 connected in parallel, is determined using Formula 2 and Formula 3.

$$R_1 = \theta + b \quad (2)$$
$$R_2 = -\theta + a + b$$

$$\frac{1}{R_3} = \frac{1}{R_1} + \frac{1}{R_2} \quad (3)$$

$$R_3 = -\frac{1}{a+2b}\left(\theta - \frac{a}{2}\right)^2 + \frac{1}{4}(a+2b)$$

The combined or synthetic resistance ($R_3$) varies with the operation ring rotation angle, as shown in FIG. 7C, and can be expressed by a quadratic formula. The resulting torque that changes corresponding to the combined resistance ($R_3$) is shown in FIG. 8B. The combined forces of the resistance force because of the friction, as shown in FIG. 8A, and the resistance force because of the motor, as shown in FIG. 8B, become the operational load required of operation ring 6, as shown in FIG. 8C. As shown in FIG. 8C, the operational load minimizes the operational load fluctuation because of the rotation angle of the operation ring 6.

The operation of the second embodiment will now be summarized. To perform lens movement, when operation member parts (the operation ring) are moved, the electricity generation device (the motor) generates electricity. The generated electric power is consumed by the electric power consumption device (the load circuit). In other words, a portion of the mechanical energy created through the movement of the operation ring is converted into electrical energy and consumed by the load circuit. The operational load required by the operator to overcome the consumed energy is excessive and allows a weighted manual operation of the lens device. The operational load can be freely set through the adjusting of the amount of electrical power consumed. The load circuit has variable resistance, and by changing the resistance, the consumed electrical power consumption is adjusted. The resistance Value is set with an external knob, but may also be automatically set according to the rotational angle of the operation ring. Additionally, by using the electricity generation motor as the lens driving motor, a compact shape can be realized.

In the second embodiment, the operational load is designed to be constant. However, there is no requirement to restrict the operational load to a constant value. A third preferred embodiment will be described below.

The third preferred embodiment is identical to the second embodiment except for the resistance force of the motor 24. As shown in FIG. 9D, the operational load of the third preferred embodiment has rapid increases on both ends of the rotational range of the operation ring 6. When an operational load with these characteristics is incorporated into the third embodiment, the operation ring 6 rotation can be dampened even in the case where the operation ring 6 is wound too far. The resistance force to be generated by the motor in this case is shown in FIG. 9C. Further, the resistance value automatic setting instrument 25, may have a resistance value as shown in FIG. 9B by combining the two variable resistors. FIG. 9A shows the frictional resistance of the operation ring 6.

A lens device is provided that, by means of a simple structure, freely adjusts the operational load for manual operations according to the environment and the preferences of the user. Further, because fluctuations in the operational load, because of environmental changes, are reduced compared to the prior art device, the lens device has superior environmental resistance. Additionally, the operational load during manual operations is small without impacting the cameras automated lens focussing. Finally, complexity is reduced and maintenance of an enclosed fluid is eliminated.

As many different embodiments of this invention may be made and used without departing from the spirit and scope, it is understood that the invention is not limited to the specific embodiments.

What is claimed is:

1. A lens device, comprising:
   a lens;
   a lens barrel that contains the lens;
   operation member parts held by the lens barrel and movably connecting the lens to the lens barrel;
   movement means for moving the lens corresponding to movement of the operation member parts;
   electricity generation means for generating generated electric power from the movement of the operation member parts; and
   electric power consumption means for consuming the generated electric power generated by the electricity generation means.

2. The lens device according to claim 1, further comprising:
   electric power supply means for supplying supplied electric power to the electricity generation means; and
   a switch connecting the electricity generation means to one of the electric power consumption means and the electric power supply means, wherein the electricity generation means when connected to the electric power supply means outputs the supplied electric power to the movement means to move the lens.

3. The lens device according to claim 1, further comprising adjustment means for adjusting the amount of electric power consumed by the electric power consumption means.

4. The lens device according to claim 1, wherein the operation member parts are rotatably held in the lens barrel, the electricity generation means includes a motor that outputs the generated electric power to the movement means during lens driving, and the electric power consumption means is a load circuit connected to the motor.

5. The lens device according to claim 4, wherein the load circuit includes a variable resistor to change the consumed amount of generated electric power generated by the motor.

6. The lens device according to claim 5, wherein the variable resistor changes resistance corresponding to a rotation angle of the operation member parts.

7. The lens device according to claim 6, wherein a friction resistance is caused by the operation member parts when the lens barrel is rotated and wherein an operational load of the lens barrel is equal to a variable resistance of the variable resistor added to the friction resistance, the operational load being constant and independent of the rotation angle.

8. The lens device according to claim 5, wherein the variable resistor has constant resistance independent of a rotation angle of the operation member parts.

9. The lens device according to claim 5, wherein the variable resistor has constant resistance independent of a rotation angle of the operation member parts, except near a pair of operation member parts rotation limits at opposite ends of a range of operation member parts rotation where the variable resistor has rapidly increasing resistance.

10. The lens device according to claim 1, further comprising holding means for holding the electric power generating means, the electric power consumption means, and the electric power supply means, wherein the holding means is attached to the lens barrel.

11. A lens device, comprising a lens;

a lens barrel that contains the lens;

an operation ring that is rotatably held by the lens barrel;

a movement device that moves the lens corresponding to rotation of the operation ring;

a motor having a rotatable shaft connected to the movement device, wherein the motor can generate electric power through rotation of the rotatable shaft;

a transfer device that rotatably connects the operation ring to the rotatable shaft of the motor; and a load circuit that consumes the generated electric power generated by the motor.

12. The lens device according to claim 11, further comprising:

a motor drive circuit to drive the motor, wherein the driven motor rotates the rotatable shaft to move the lens; and a switch movable between a motor drive position and a manual operation position, wherein when said switch is in the motor drive position, the motor is connected to the motor drive circuit, and wherein when said switch is in the manual operation position, the motor is connected to the load circuit.

13. The lens device according to claim 12, further comprising a variable resistor for adjusting the amount of generated electric power consumed by the load circuit.

14. The lens device according to claim 13, wherein the variable resistor changes resistance corresponding to a rotation angle of the operation ring.

15. The lens device according to claim 14, wherein a friction resistance is caused by the operation ring and the movement device when the lens barrel is rotated, and wherein an operational load of the operation ring is equal to a variable resistance of the variable resistor added to the friction resistance, the operational load being constant and independent of the rotation angle.

16. A method for focussing a lens, the method comprising the steps of:

holding a lens in a lens barrel;

movably connecting operation member parts to the lens barrel;

moving the lens in accordance with movement of the operation member parts;

generating, with electric generation means, electric power from the movement of the operation member parts; and consuming, with electric consuming means, the generated electric power generated in the generating step.

17. The method of claim 16, further comprising the steps of:

supplying electric power for the generating step from electric power supply means; and connecting the electric generation means through a switch to one of the electric power consumption means and the electric power supply means, wherein the electric generation means when connected to the electric power supply means outputs the supplied electric power to the movement means to move the lens.

18. The method of claim 17, further comprising the step of adjusting the amount of generated electric power consumed by the electric power consumption means.

19. The method of claim 18, wherein the adjusting step comprises adjusting the amount of generated electric power consumed corresponding to a rotation angle of the operation member parts.

20. The method of claim 19, further comprising adding the amount of generated electric power consumed corresponding to a rotation angle of the operation member parts to a friction resistance caused by the operation member parts when the lens barrel is rotated so that an operational load of the lens barrel is constant and independent of the rotation angle.

21. A lens device operable in a manual focus mode and an automatic focus mode, the lens device comprising:

a lens supported by a lens barrel;

an operation ring rotatably coupled to the lens barrel, wherein the lens barrel and the lens are moved by rotation of the operation ring; and a lens drive device coupled to the operation ring, the lens drive device including:

a motor, a motor drive circuit operatively engagable with the motor, a variable resistor operatively engagable with the motor, and a selection switch selectively connecting the motor drive circuit to the motor in the automatic focus mode and the variable resistor to the motor in the manual focus mode.

22. The lens device according to claim 21, wherein the operation ring comprises an operation ring gear at an outer periphery of the operation ring, the lens driving device further comprising a deceleration device connected to the motor and including a deceleration gear, the deceleration gear engaging the operation ring gear.

23. The lens device according to claim 21, wherein the variable resistor comprises an adjustment knob for adjusting a resistance of the variable resistor.

24. The lens device according to claim 21, further comprising a holding device attached to the lens barrel and enclosing the lens drive device.

* * * * *